United States Patent
Saulsbury et al.

(10) Patent No.: US 6,766,428 B2
(45) Date of Patent: Jul. 20, 2004

(54) METHOD AND APPARATUS FOR STORING PRIOR VERSIONS OF MODIFIED VALUES TO FACILITATE RELIABLE EXECUTION

(75) Inventors: Ashley N. Saulsbury, Los Gatos, CA (US); James E. Kocol, San Diego, CA (US); Sandra C. Lee, Carlsbad, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 420 days.

(21) Appl. No.: 09/827,437

(22) Filed: Apr. 6, 2001

(65) Prior Publication Data

US 2002/0147891 A1 Oct. 10, 2002

(51) Int. Cl.[7] .............................................. G06F 13/00
(52) U.S. Cl. ...................................... 711/154; 711/156
(58) Field of Search ................................ 711/154, 156, 711/161, 162; 714/6, 19

(56) References Cited

U.S. PATENT DOCUMENTS

| | | | | |
|---|---|---|---|---|
| 4,628,477 A | * | 12/1986 | Burrows | 711/219 |
| 6,088,773 A | * | 7/2000 | Kano et al. | 711/161 |
| 6,148,416 A | * | 11/2000 | Masubuchi | 714/15 |
| 2002/0147890 A1 | * | 10/2002 | Saulsbury et al. | 711/154 |

FOREIGN PATENT DOCUMENTS

JP          11015743 A    *   1/1999            G06F/13/00

* cited by examiner

Primary Examiner—Reba I. Elmore
(74) Attorney, Agent, or Firm—Park, Vaughan & Fleming LLP

(57) ABSTRACT

One embodiment of the present invention provides a system that facilitates reliable execution in a computer system by keeping track of write operations to a main memory of the computer system in order to undo the write operations if necessary. This system operates by receiving a write operation directed to the main memory at a memory controller, wherein the write operation includes data to be written to the main memory and a write address specifying a location in the main memory into which the data is to be written. Next, the system examines a log bit associated with the write address, wherein the log bit indicates whether an existing value from the write address in main memory has been copied to a checkpoint store. If the log bit is not set, the system creates a new entry for the write address in the checkpoint store; retrieves an existing value from the write address in the main memory; and stores the existing value to the new entry in the checkpoint store. The system then stores the data to be written to write address in the main memory. The system also periodically performs a checkpointing operation, which clears all entries from the checkpoint store.

21 Claims, 6 Drawing Sheets

METHOD AND APPARATUS FOR STORING PRIOR VERSIONS OF MODIFIED VALUES TO FACILITATE RELIABLE EXECUTION

RELATED APPLICATION

The subject matter of this application is related to the subject matter in a co-pending non-provisional application by the same inventors as the instant application and filed on the same day as the instant application entitled, "Method and Apparatus for Checkpointing to Facilitate Reliable Execution," having Ser. No. 09/827,426, and filing date Apr. 6, 2001.

BACKGROUND

1. Field of the Invention

The present invention relates to reliability in computer systems. More specifically, the present invention relates to a method and an apparatus for facilitating reliable execution in a computer system by keeping track of modifications to main memory in order to enable a rollback if an error condition arises.

2. Related Art

Reliability is critically important for some computer systems, such as computer systems that process credit card transactions or computer systems that assist air traffic controllers. These types of computer systems often include circuitry to detect error conditions. For example, computer systems often include circuitry that uses error correcting codes to detect and correct errors on-the-fly while a computer system is executing. However, providing additional circuitry to detect error conditions increases the complexity of a computer system, which can greatly increase the amount of time required to design and build a computer system.

Furthermore, even if an error is detected, it may not be possible to backtrack far enough to be able to resume execution from a prior error-free state.

In order to remedy this problem, some computer systems periodically perform checkpointing operations to save the state of a computation so that the computation can be rolled back to a prior state and restarted when an error occurs. Performing a checkpointing operation typically involves executing software to save the state of an application to an archival storage device.

Unfortunately, performing a checkpointing operation can seriously degrade the performance of a computer system because performing the checkpointing operation typically requires the application to be halted while the entire state of the application is copied to archival storage. Hence, checkpointing operations are often impractical to perform for applications that require a significant amount of computational performance.

What is needed is a method and an apparatus that facilitates rolling back a computation without spending a large amount of time performing checkpointing operations.

SUMMARY

One embodiment of the present invention provides a system that facilitates reliable execution in a computer system by periodically checkpointing write operations to a main memory of the computer system. The system operates by receiving a write operation directed to the main memory at a memory controller, wherein the write operation includes data to be written to the main memory and a write address specifying a location in the main memory into which the data is to be written. Next, the system looks up the write address in a checkpoint store coupled to the memory controller. If the write address is not associated with any entry in the checkpoint store, the system creates an entry for the write address in the checkpoint store, and writes the data to be written to the entry. The system then periodically performs a checkpointing operation, which transfers the data to be written from the checkpoint store to the write address in the main memory.

In one embodiment of the present invention, the system additionally receives a read operation at the memory controller, wherein the read operation is directed to a read address specifying a location in the main memory to be read from. Next, the system looks up the read address in the checkpoint store. If the read address is associated with an entry in the checkpoint store, the system retrieves data from the entry in the checkpoint store to satisfy the read operation. Otherwise, if the read address is not associated with any entry in the checkpoint store, the system retrieves data from the read address in the main memory to satisfy the read operation.

In one embodiment of the present invention, the checkpoint store is organized as a cache memory.

In one embodiment of the present invention, if a new entry is to be added to the checkpoint store and no room exists in the checkpoint store for the new entry, the system performs a checkpointing operation to transfer the contents of the checkpoint store to the main memory.

In one embodiment of the present invention, the system performs the checkpointing operation by: stopping execution of a central processing unit; storing an internal state of the central processing unit to the main memory; transferring the data to be written from the checkpoint store to the write address in the main memory; and recommencing execution of the central processing unit.

In one embodiment of the present invention, the internal state of the central processing unit includes contents of internal registers in the central processing unit, and dirty cache lines associated with the central processing unit.

In one embodiment of the present invention, the system additionally delays I/O operations so that the I/O operations are performed after a subsequent checkpoint operation.

One embodiment of the present invention provides a system that facilitates reliable execution in a computer system by keeping track of write operations to a main memory of the computer system in order to undo the write operations if necessary. This system operates by receiving a write operation directed to the main memory at a memory controller, wherein the write operation includes data to be written to the main memory and a write address specifying a location in the main memory into which the data is to be written. Next, the system examines a log bit associated with the write address, wherein the log bit indicates whether an existing value from the write address in main memory has been copied to a checkpoint store. If the log bit is not set, the system creates a new entry for the write address in the checkpoint store; retrieves an existing value from the write address in the main memory; and stores the existing value to the new entry in the checkpoint store. The system then stores the data to be written to write address in the main memory. The system also periodically performs a checkpointing operation, which clears all entries from the checkpoint store.

In one embodiment of the present invention, upon receiving a read operation at the memory controller, the system retrieves data from the read address in the main memory to satisfy the read operation.

In one embodiment of the present invention, the checkpoint store is organized as a first-in-first-out (FIFO) buffer.

In one embodiment of the present invention, if an error occurs during execution of the computer system, the system restores a state of the main memory to a preceding checkpoint by replacing values that have been modified with prior values retrieved from the checkpoint store. The system also restores the internal state of the central processing unit from the main memory.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
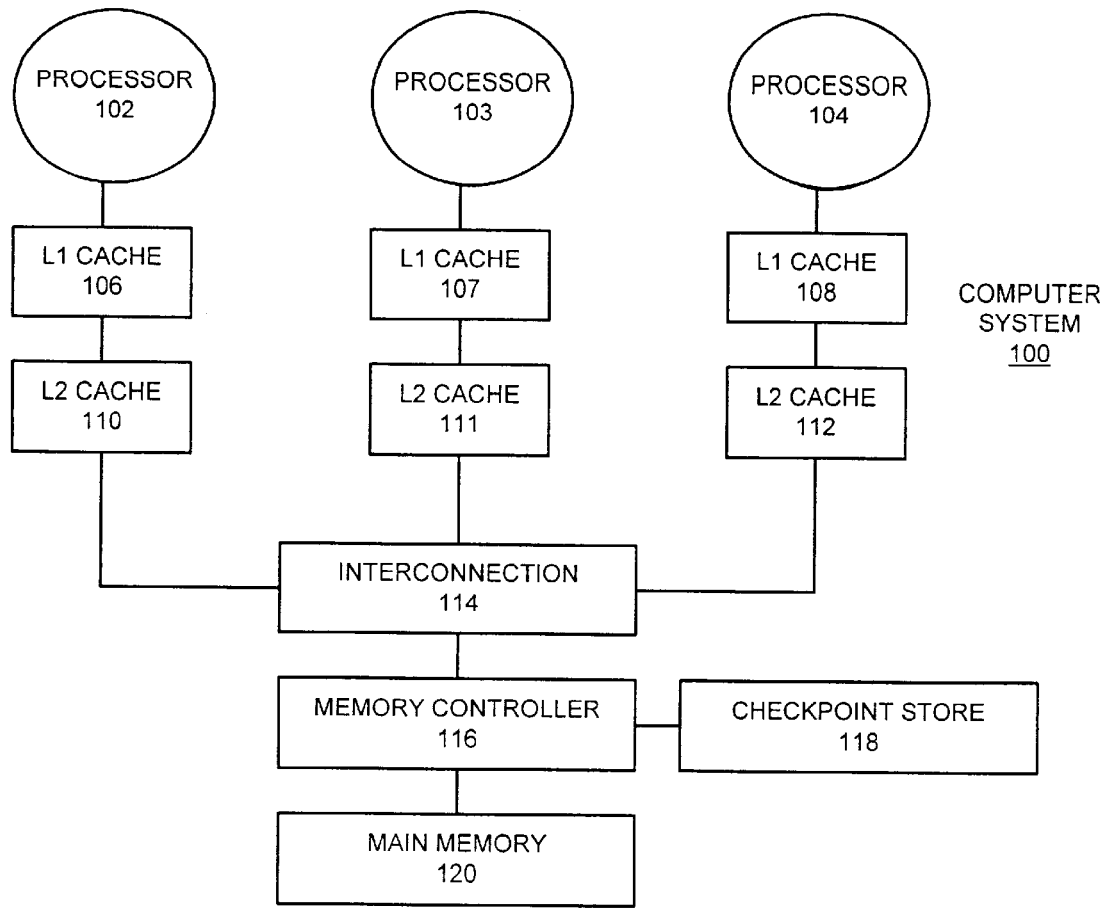
FIG. 1 illustrates a computer system in accordance with an embodiment of the present invention.

FIG. 1 illustrates a computer system 100 in accordance with an embodiment of the present invention. Computer system 100 includes processors 102–104, memory controller 116, checkpoint store 118 and main memory 120. Processors 102–104 can generally include any type of computational device, such as a microprocessor. Processors 102–104 operate on code and data stored within main memory 120. Main memory 120 can generally include any type of random-access memory that can be used to store code and data.

Processors 102–104 access main memory through memory controller 116. Memory controller 116 is coupled to processors 102–104 through L1 caches 106–108, L2 caches 110–112 and interconnection 114. L1 caches 106–108 are first-level caches for storing code and data for processors 102–104, respectively. L2 caches 110–112 are second-level caches for storing code and data, for processors 102–104, respectively. Interconnection 114 can include any type of communication pathway for routing communications between processors 102–104 and memory controller 116. In one embodiment of the present invention, interconnection 114 includes a bus. In another embodiment, interconnection 114 includes a switching network.

During write operations to main memory 120, memory controller 116 stores data into checkpoint store 118. This enables computer system 100 to rollback to a previous checkpointed state when an error occurs during operation of computer system 100. The operation of checkpoint store 118 is described in more detail below with reference to FIGS. 3–9.

Note that although the present invention is described in the context of a multi-processor system, the present invention can generally be applied to any type of computer system, including a uniprocessor system as well as a multi-processor system.

Checkpoint Operations

Figure 2:
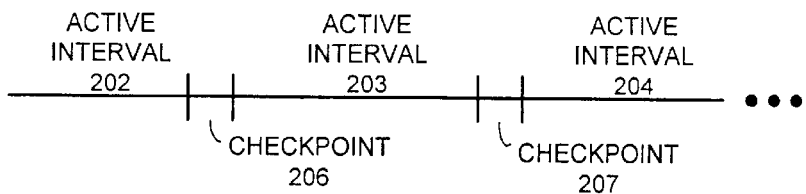
FIG. 2 illustrates the timing of checkpointing operations in accordance with an embodiment of the present invention.

FIG. 2 illustrates the timing of checkpointing operations in accordance with an embodiment of the present invention. In this embodiment, checkpointing operations 206–207 take place periodically between active intervals 202–204. Normal program execution takes place during active intervals 202–204, but is suspended while checkpoints 206–207 take place.

Cache-Based Implementation

Figure 3:
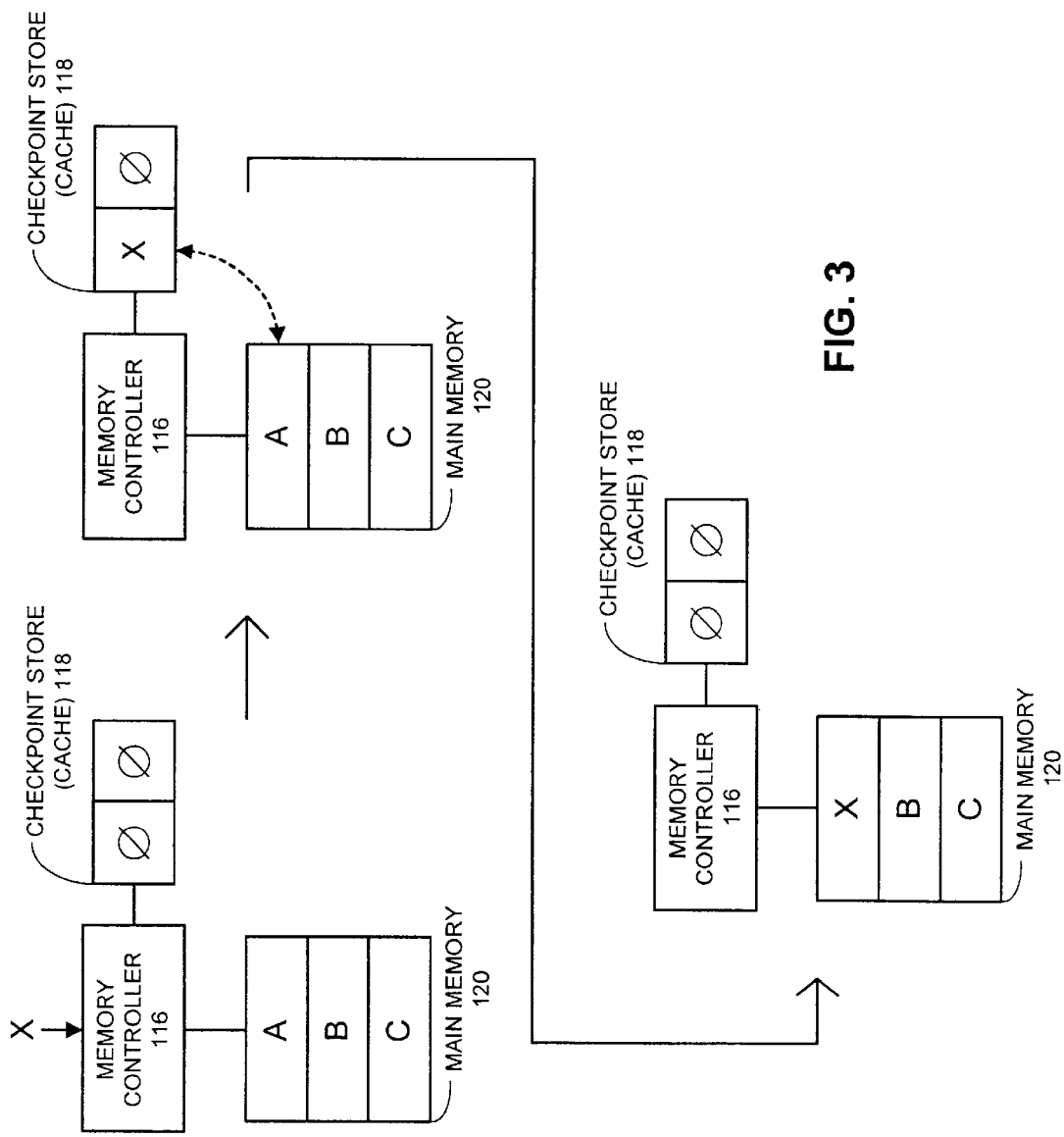
FIG. 3 illustrates how a cache-based implementation of a checkpoint store operates in accordance with an embodiment of the present invention.

FIG. 3 illustrates how a cache-based implementation of checkpoint store 118 operates in accordance with an embodiment of the present invention. On the left-hand side of FIG. 3, memory controller 116 receives a value to be written "X" as part of a write operation directed to a location in main memory 120 presently containing the value "A".

Next, this value X is written into checkpoint store 118 as is illustrated in the middle portion of FIG. 3. In the embodiment of the present invention, checkpoint store 118 is organized as a cache memory. For example, checkpoint store 118 can be organized as a 64-way set-associative cache memory containing 16K entries, wherein each entry is 128 bytes in size.

Unlike a conventional cache memory, checkpoint store 118 does not discard an old cache entry if there is no space for a new cache entry, because doing so would cause data to be lost. Instead, if no space is available for a new cache entry, space is created by triggering a checkpointing operation, which transfers data values from checkpoint store 118 to main memory 120.

During a subsequent checkpointing operation, the value X is transferred from checkpoint store 118 to the location containing the value A in main memory 120, and the corresponding entry in checkpoint store 118 containing the value X is cleared.

Figure 4A:
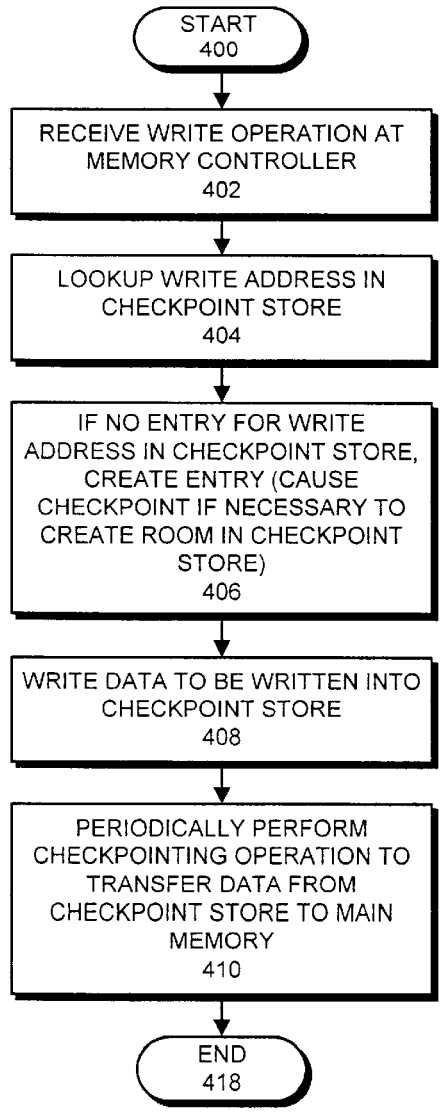
FIG. 4A is a flow chart the process of performing a write operation in accordance with the embodiment of the present invention illustrated in FIG. 3.

FIG. 4A is a flow chart the process of performing a write operation in accordance with the embodiment of the present invention illustrated in FIG. 3. First, the system receives the write operation at memory controller 116 (step 402). This write operation includes data to be written as well as a write address specifying a location within main memory 120 that the write operation is directed to. Next, the system looks up the write address in checkpoint store 118 (step 404). If no entry exists for the write address in checkpoint store 118, the system creates an entry in checkpoint store 118 (step 406). Note that if no room exists for the new entry in checkpoint store 118, the system can create room by triggering a checkpoint operation to flush to contents of checkpoint store 118 to main memory 120. Next, the system writes the data to be written to the associated entry in checkpoint store 118 (step 408). The system also periodically performs a checkpointing operation to transfer data from checkpoint store 118 to main memory 120 (step 410).

Figure 4B:
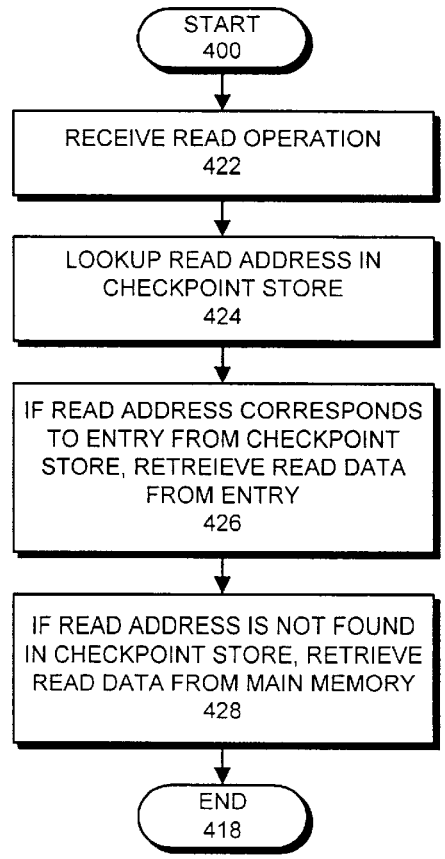
FIG. 4B is a flow chart illustrating the process of performing a read operation in accordance with the embodiment of the present invention illustrated in FIG. 3.

FIG. 4B is a flow chart illustrating the process of performing a read operation in accordance with the embodiment of the present invention illustrated in FIG. 3. The system first receives a read operation at memory controller 116 (step 422). Next, the system looks up the read address in checkpoint store 118 (step 424). If the read address corresponds to an entry in checkpoint store 118, the system retrieves the read data from checkpoint store 118 (step 426). Otherwise, if the read address is not found in checkpoint store 118, the system retrieves the read data from the read address in main memory (step 428).

Figure 5:
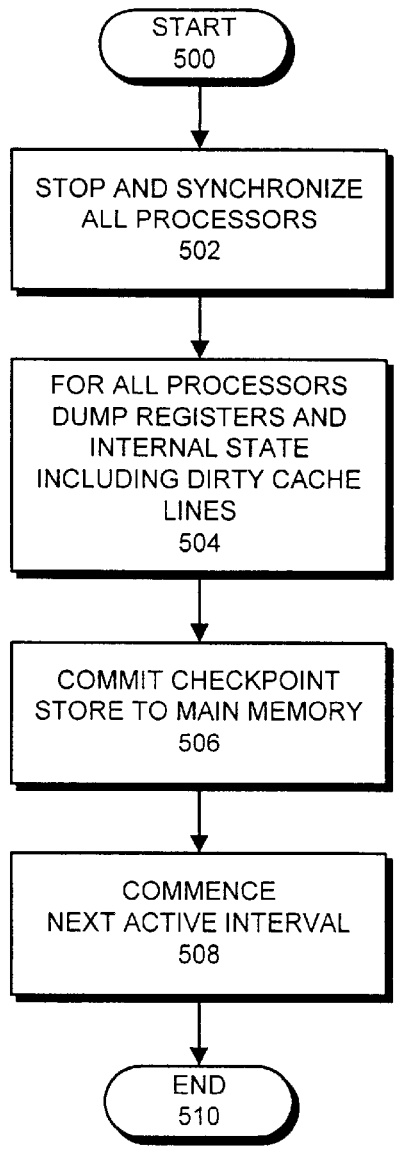
FIG. 5 is a flow chart illustrating the process of performing a checkpointing operation in accordance with the embodiment of the present invention illustrated in FIG. 3.

FIG. 5 is a flow chart illustrating the process of performing a checkpointing operation in accordance with the embodiment of the present invention illustrated in FIG. 3. During a checkpointing operation, the system stops and synchronizes all processors in the computer system (step 502). Next, for all processors, the system saves internal registers and other internal processor state, including dirty cache lines, to main memory 120 (step 504). Note that this internal processor state may include information about which translation lookaside buffer (TLB) entries have been locked. However, other types of performance enhancing processor state, such as branch history table information, does not need to be saved.

Next, the system commits the contents of checkpoint store 118 to main memory (step 506). This involves copying entries from checkpoint store 118 to main memory 120 and then zeroing out the contents of checkpoint store 118.

The checkpointing operation is now complete, and the system commences execution of the next active interval (step 508).

Figure 6:
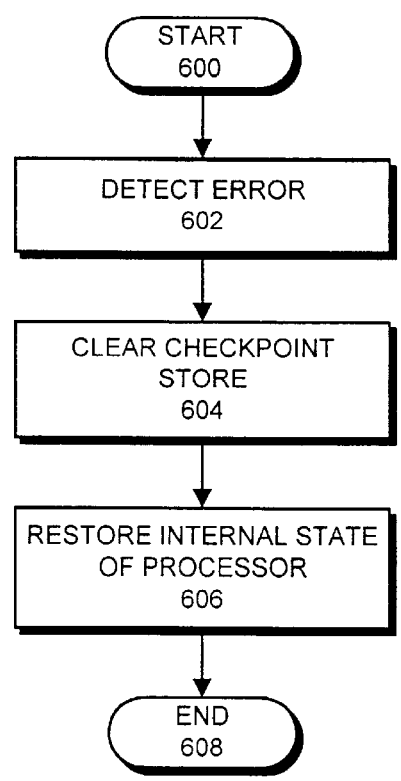
FIG. 6 is a flow chart illustrating the process of performing a rollback operation when an error occurs in accordance with an embodiment of the present invention.

FIG. 6 is a flow chart illustrating the process of performing a rollback operation when an error occurs in accordance with an embodiment of the present invention. Upon detecting an error (step 602), the system clears checkpoint store 118 (step 604), and then restores the internal state of all of the processors from main memory (step 606). Note that this internal processor state was stored to main memory during a preceding checkpointing operation. At this point, computer system 100 is restored to its state at the previous checkpoint and is able to recommence execution from the previous checkpoint.

FIFO-Based Implementation

Figure 7:
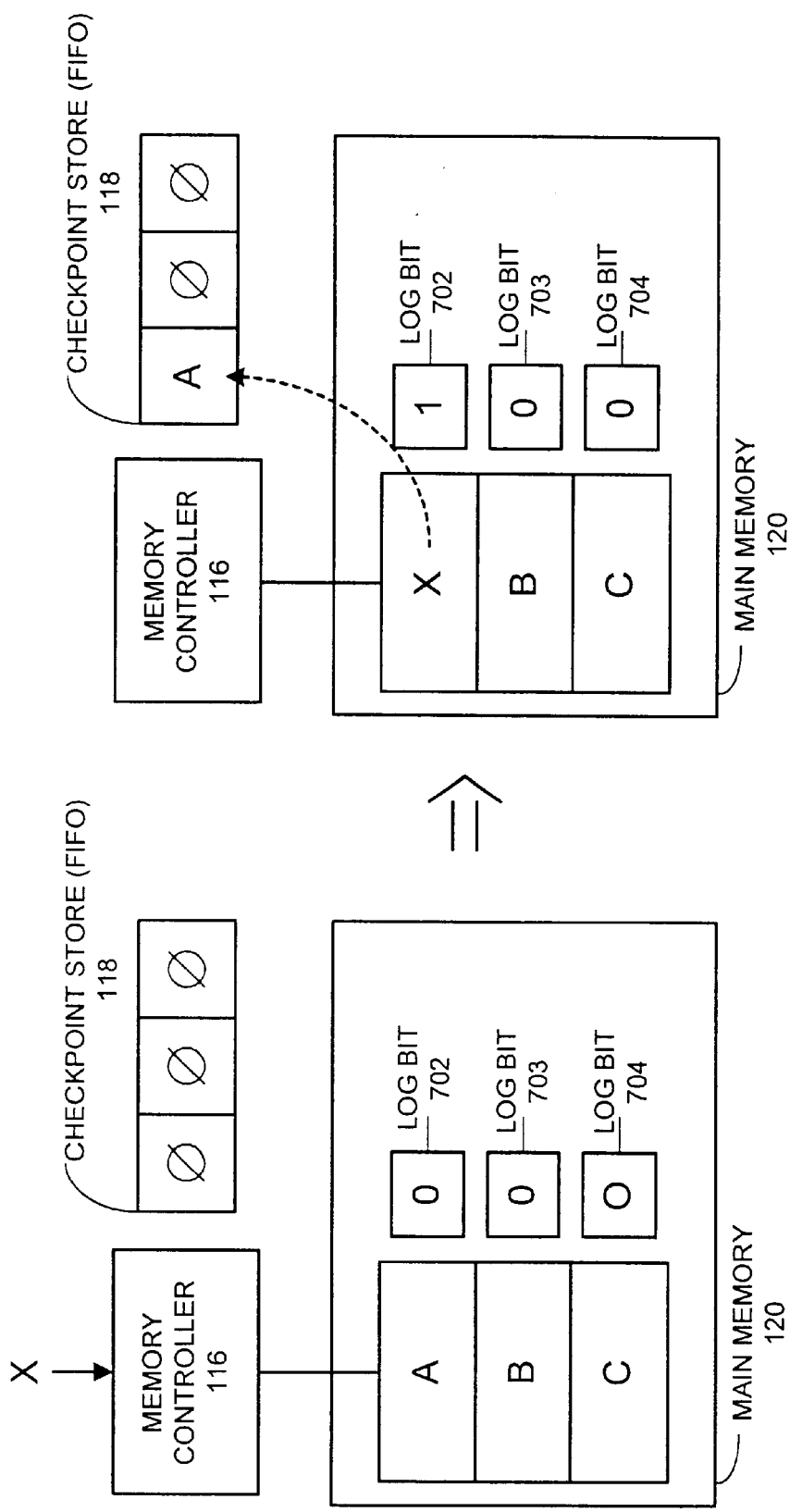
FIG. 7 illustrates how a first-in-first-out (FIFO) buffer implementation of a checkpoint store operates in accordance with an embodiment of the present invention.

FIG. 7 illustrates how a first-in-first-out (FIFO) buffer implementation of checkpoint store 118 operates in accordance with an embodiment of the present invention.

On the left-hand side of FIG. 7, memory controller 116 receives a value to be written "X" as part of a write operation directed to a location in main memory 120 presently containing the value "A". Note that each entry in main memory 120 is associated a log bit, which indicates whether a prior value contained in the entry has been copied to checkpoint store 118. If so, the system knows that it does not have to copy the value to checkpoint store 118 again. Note that this log bit can reside within memory controller 116, or alternatively within main memory 120 itself.

Next, if the log bit for the location in main memory 120 has not been set, the system copies the prior value "A" from the write address in main memory 120 into checkpoint store 118.

After the prior value A has been copied to checkpoint store 118, the system writes the value X to the location in main memory 120 formerly containing the value A.

During a subsequent checkpointing operation, checkpoint store 118 and the log bits 702–704 can simply be cleared.

In the embodiment illustrated in FIG. 7, checkpoint store 118 is organized as a first-in-first-out (FIFO) buffer. This allows data to be read out of the FIFO buffer in the order in which it was entered into the FIFO buffer. Also note that a FIFO buffer is significantly simpler to implement than a cache memory.

Figure 8A:
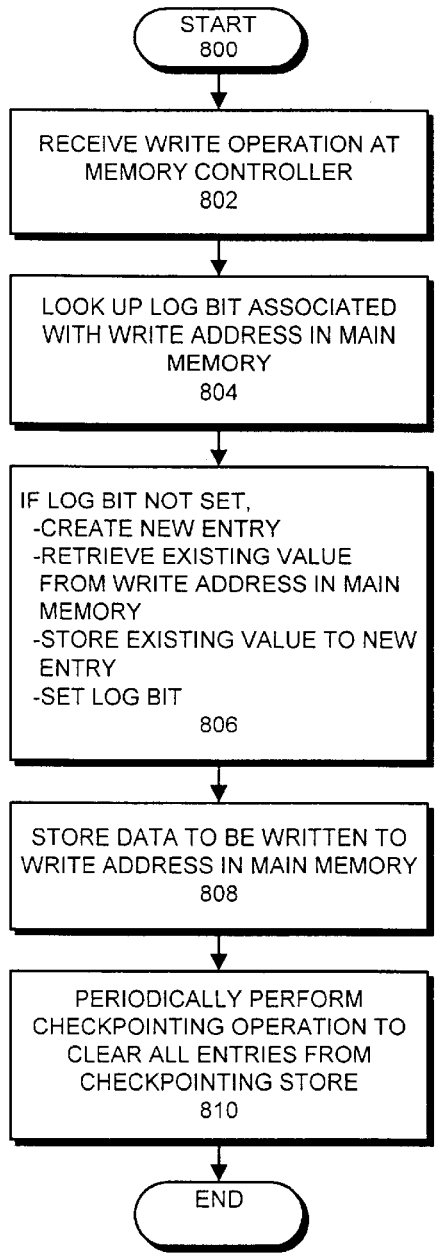
FIG. 8A is a flow chart illustrating the process of performing a write operation for the embodiment of the present invention illustrated in FIG. 7.

FIG. 8A is a flow chart illustrating the process of performing a write operation for the embodiment of the present invention illustrated in FIG. 7. First, the system receives the write operation at memory controller 116 (step 802). This write operation includes data to be written as well as a write address specifying a location within main memory 120 that the write operation is directed to. Next, the system examines the log bit associated with the write address (step 804). If the log bit has not been set, no entry exists for the write address in checkpoint store 118. In this case, the system creates an entry in checkpoint store 118 for the write address, retrieves an existing value from the write address in main memory 120, and stores the existing value to the new entry (step 806). The system also sets the associated log bit.

Note that if no room exists for the new entry in checkpoint store 118, the system can create room by triggering a checkpoint operation to clear the entries from checkpoint store 118.

Next, the system stores the data to be written to the write address in main memory 120 (step 808). The system also periodically performs a checkpointing operation that clears prior values that have been saved in checkpoint store 118 (step 810).

Figure 8B:
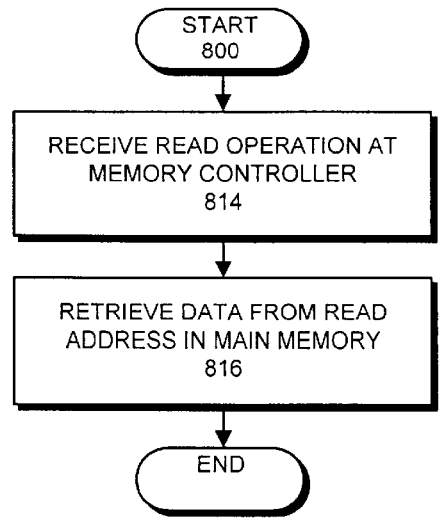
FIG. 8B is a flow chart illustrating the process of performing a read operation for the embodiment of the present invention illustrated in FIG. 7.

FIG. 8B is a flow chart illustrating the process of performing a read operation for the embodiment of the present invention illustrated in FIG. 7. The system first receives a read operation at memory controller 116 (step 814). Next, the system retrieves the read data from the read address in main memory (step 816).

Figure 9:
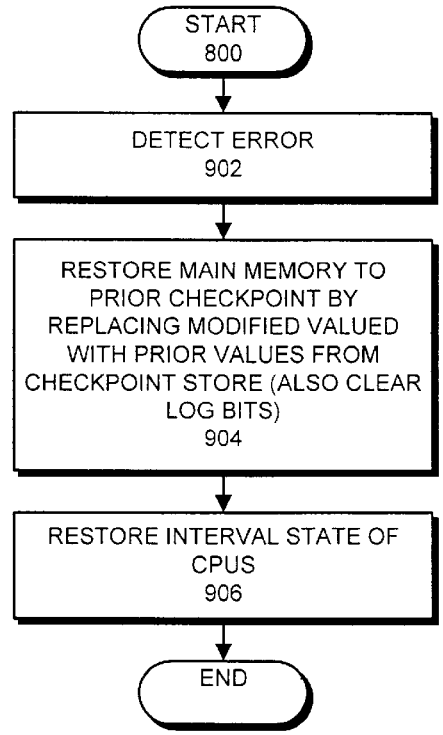
FIG. 9 is a flow chart illustrating the process of performing a rollback operation when an error occurs in accordance with the embodiment of the present invention illustrated in FIG. 7.

FIG. 9 is a flow chart illustrating the process of performing a rollback operation when an error occurs in accordance with the embodiment of the present invention illustrated in FIG. 7. Upon detecting an error (step 902), the system restores main memory to a prior checkpoint by replacing modified values in main memory 120 with prior values that have been saved in checkpoint store 118 (step 904). The system also clears all of the log bits that have been set. Next, the system restores the internal state of the processors from main memory (step 906). At this point computer system 100 is restored to its state at the previous checkpoint and is able to recommence execution.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating reliable execution in a computer system by keeping track of write operations to a main memory of the computer system in order to undo the write operations if necessary, comprising:

receiving a write operation directed to the main memory at a memory controller, the write operation including data to be written to the main memory and a write address specifying a location in the main memory into which the data is to be written;

examining a log bit associated with the write address, wherein the log bit indicates whether an existing value from the write address in main memory has been copied to a checkpoint store, wherein the checkpoint store is organized as a first-in-first-out (FIFO) buffer;

if the log bit is not set,
creating a new entry for the write address in the checkpoint store,
retrieving the existing value from the write address in the main memory, and
storing the existing value to the new entry in the checkpoint store;

wherein if the log bit is set, no store operation occurs into the checkpoint store;

storing the data to be written to write address in the main memory; and periodically performing a checkpointing operation, wherein performing the checkpointing operation involves clearing all entries from the checkpoint store.

2. The method of claim 1, further comprising:
receiving a read operation at the memory controller, the read operation being directed to a read address specifying a location in the main memory to be read from; and
retrieving data from the read address in the main memory to satisfy the read operation.

3. The method of claim 1, wherein if the new entry is to be added to the checkpoint store and no room exists in the checkpoint store for the new entry, the method further comprises performing a checkpointing operation to clear all entries from the checkpoint store.

4. The method of claim 1, wherein performing the checkpointing operation involves:
stopping execution of active programs in the computer system;
storing an internal state of the central processing unit to the main memory;
clearing all entries from the checkpoint store; and
resuming execution of the active programs.

5. The method of claim 4, wherein the internal state of the central processing unit includes:
contents of internal registers in the central processing unit; and
dirty cache lines associated with the central processing unit.

6. The method of claim 1, further comprising delaying I/O operations so that the I/O operations are performed after a subsequent checkpoint operation.

7. The method of claim 1, wherein if an error occurs during execution of the computer system, the method further comprises:
restoring a state of the main memory to a preceding checkpoint by replacing values that have been modified with prior values retrieved from the checkpoint store; and
restoring the internal state of the central processing unit from the main memory.

8. A computer-readable storage medium storing instructions that when executed by a computer cause the computer to perform a method for facilitating reliable execution in a computer system by keeping track of write operations to a main memory of the computer system in order to undo the write operations if necessary, the method comprising:

receiving a write operation directed to the main memory at a memory controller, the write operation including data to be written to the main memory and a write address specifying a location in the main memory into which the data is to be written;

examining a log bit associated with the write address, wherein the log bit indicates whether an existing value from the write address in main memory has been copied to a checkpoint store, wherein the checkpoint store is organized as a first-in-first-out (FIFO) buffer;

if the log bit is not set,
creating a new entry for the write address in the checkpoint store,
retrieving the existing value from the write address in the main memory, and
storing the existing value to the new entry in the checkpoint store;

wherein if the log bit is set, no store operation occurs into the checkpoint store;

storing the data to be written to write address in the main memory; and periodically performing a checkpointing operation, wherein performing the checkpointing operation involves clearing all entries from the checkpoint store.

9. The computer-readable storage medium of claim 8, wherein the method further comprises:
receiving a read operation at the memory controller, the read operation being directed to a read address specifying a location in the main memory to be read from; and
retrieving data from the read address in the main memory to satisfy the read operation.

10. The computer-readable storage medium of claim 8, wherein if the new entry is to be added to the checkpoint store and no room exists in the checkpoint store for the new entry, the method further comprises performing a checkpointing operation to clear all entries from the checkpoint store.

11. The computer-readable storage medium of claim 8, wherein performing the checkpointing operation involves:
stopping execution of active programs in the computer system;
storing an internal state of the central processing unit to the main memory;
clearing all entries from the checkpoint store; and
resuming execution of active programs.

12. The computer-readable storage medium of claim 11, wherein the internal state of the central processing unit includes:
contents of internal registers in the central processing unit; and dirty cache lines associated with the central processing unit.

13. The computer-readable storage medium of claim 8, wherein the method further comprises delaying I/O operations so that the I/O operations are performed after a subsequent checkpoint operation.

14. The computer-readable storage medium of claim 8, wherein if an error occurs during execution of the computer system, the method further comprises:
   restoring a state of the main memory to a preceding checkpoint by replacing values that have been modified with prior values retrieved from the checkpoint store; and
   restoring the internal state of the central processing unit from the main memory.

15. An apparatus that facilitates reliable execution in a computer system by keeping track of write operations to a main memory of the computer system in order to undo the write operations if necessary, comprising:
   a memory controller coupled to the main memory;
   a receiving mechanism that is configured to receive a write operation directed to the main memory at the memory controller, the write operation including data to be written to the main memory and a write address specifying a location in the main memory into which the data is to be written;
   a checkpoint store, coupled to the memory controller, which is configured to store prior versions of values that have been modified in main memory, wherein the checkpoint store is organized as a first-in-first-out (FIFO) buffer;
   a lookup mechanism that is configured to look up a log bit associated with the write address, wherein the log bit indicates whether a prior value from the write address in main memory has been copied to the checkpoint store;
   a writing mechanism that is configured to store the data to be written to write address in the main memory;
   wherein if the log bit for an entry is not set, the writing mechanism is configured to,
      create a new entry for the write address in the checkpoint store,
      retrieve an existing value from the write address in the main memory, and to
      store the existing value to the new entry in the checkpoint store; and
   wherein if the log bit is set, no store operation occurs into the checkpoint store;
   a checkpointing mechanism that is configured to periodically perform a checkpointing operation, wherein performing the checkpointing operation involves clearing all entries from the checkpoint store.

16. The apparatus of claim 15,
   wherein the receiving mechanism is additionally configured to receive a read operation at the memory controller, the read operation being directed to a read address specifying a location in the main memory to be read from; and
   further comprising a reading mechanism that is configured to retrieve data from the read address in the main memory to satisfy the read operation.

17. The apparatus of claim 15, wherein if the new entry is to be added to the checkpoint store and no room exists in the checkpoint store for the new entry, the checkpointing mechanism is configured to perform a checkpoint operation to clear all entries from the checkpoint store.

18. The apparatus of claim 15, wherein the checkpointing mechanism is configured to:
   stop execution of active programs in the computer system;
   store an internal state of the central processing unit to the main memory;
   clear all entries from the checkpoint store; and to
   resume execution of active programs.

19. The apparatus of claim 18, wherein the internal state of the central processing unit includes:
   contents of internal registers in the central processing unit; and
   dirty cache lines associated with the central processing unit.

20. The apparatus of claim 15, further comprising an I/O processing mechanism that is configured to delay I/O operations so that the I/O operations are performed after a subsequent checkpoint operation.

21. The apparatus of claim 15, further comprising a rollback mechanism that is configured to:
   restore a state of the main memory to a preceding checkpoint by replacing values that have been modified with prior values retrieved from the checkpoint store if an error occurs during execution of the computer system; and to
   restore the internal state of the central processing unit from the main memory.

* * * * *